US005705065A

United States Patent [19]

Sharpe

[11] Patent Number: 5,705,065
[45] Date of Patent: Jan. 6, 1998

[54] SEA WATER STRAINER

[75] Inventor: Curtis L. Sharpe, Matthews, N.C.

[73] Assignee: Conbraco Industries, Inc., Matthews, N.C.

[21] Appl. No.: 709,003

[22] Filed: Sep. 6, 1996

[51] Int. Cl.⁶ ............................................. B01D 27/08
[52] U.S. Cl. ..................... 210/232; 210/94; 210/249;
210/422; 210/443; 210/444; 210/446; 210/447;
210/448; 210/453; 210/455; 210/459
[58] Field of Search ........................ 210/94, 170, 171,
210/232, 249, 422, 443, 444, 446, 447,
448, 453, 455, 459; 440/88; 137/140, 549

[56] References Cited

U.S. PATENT DOCUMENTS

| | | |
|---|---|---|
| 283,103 | 8/1883 | Hartmann . |
| 413,021 | 1/1889 | Büring . |
| 1,464,822 | 8/1923 | Justus . |
| 1,506,967 | 9/1924 | Bosworth . |
| 2,106,218 | 1/1938 | Krieck . |
| 2,372,570 | 3/1945 | Hallenius et al. . |
| 2,511,800 | 6/1950 | Wilkinson . |
| 2,576,144 | 11/1951 | Rood . |
| 3,237,770 | 3/1966 | Humbert, Jr. ........................ 210/438 |
| 3,334,754 | 8/1967 | Kudlaty ............................... 210/444 |
| 3,608,726 | 9/1971 | Crowther ............................. 210/456 |
| 4,452,695 | 6/1984 | Schmidt ............................... 210/249 |
| 4,476,019 | 10/1984 | Nowisch et al. ..................... 210/249 |
| 4,654,142 | 3/1987 | Thomsen et al. . |
| 4,725,354 | 2/1988 | Thomsen et al. . |
| 4,919,800 | 4/1990 | Vinoski ................................ 210/94 |
| 5,084,172 | 1/1992 | Yee ..................................... 210/249 |
| 5,139,658 | 8/1992 | Hodge ................................. 210/171 |
| 5,304,300 | 4/1994 | Parsons .............................. 210/249 |
| 5,474,676 | 12/1995 | Janik et al. ......................... 210/249 |
| 5,484,527 | 1/1996 | Janik et al. ......................... 210/249 |

Primary Examiner—W. L. Walker
Attorney, Agent, or Firm—Kennedy Covington Lobdell & Hickman, LLP

[57] ABSTRACT

A sea water strainer for use with marine craft includes a reservoir forming member disposed intermediate two ends portions. The end portions are formed with inlet and outlet fluid channels which are selectively accessible and blockable to direct the flow through the strainer. Further, an arrangement for mounting the strainer is provided with inclined bores through which bolts may pass with their operational interface directed angularly upwardly for easy access by conventional tools.

27 Claims, 4 Drawing Sheets

SEA WATER STRAINER

BACKGROUND OF THE INVENTION

The present invention relates generally to marine water, including fresh water and other fluids, filtration apparatus and, more particularly, to a sea water strainer for use on marine craft including ships, yachts and boats.

Generally sea water strainers are used in marine craft as coarse filters for incoming sea water for onboard use. Such strainers are placed upstream of valves in order to prevent coarse material from fouling the valves. Typical filtration media include perforated metal baskets with relatively wide openings compared to more common, less porous filter media. These strainers typically include an inlet and an outlet with the filter media disposed therebetween and are configured for mounting with bolts on a hull, bulkhead or other support structure.

In the past, the units have required a complex, time-consuming installation. Mounting holes provided on the units are typically located so that the strainer body blocks mounting tool access. This requires that a separate mounting plate be fabricated. A bolt pattern must be traced onto the mounting plate which matches the mounting holes in the strainer wherein the strainer is then mounted to the mounting plate. The entire assembly is then mounted to a bulkhead or stringer in the boat. A different model requires mounting the top portion in a similar manner with the bottom portion being strapped with a plastic tie to a separate bracket which requires additional installation work. Further, the use of a plastic tie strap makes the integrity of this system questionable.

At times it becomes necessary to drain the water from the strainer. Prior art units mount a drain plug on the bottom of the strainer. With a typical mounting location being at or near the deck, drain access is difficult. Other prior art units mold a drain outlet on the side of a sight glass. Nevertheless, such a plastic plug may break off during use. A metal plug cannot be used for it would be isolated and subject to galvanic corrosion.

Prior art units are also difficult to disassemble. Commonly, strainers require disassembly for cleaning marine growth from the inside surface of the reservoir or for seal replacement. The typical strainer includes two end caps separated by a transparent reservoir forming wall member with the end caps being held in place by so-called tie rods. In the prior art, the rods are threadedly attached directly into corresponding threaded openings formed in the end caps. The threaded joints are susceptible to corrosion wherein the tie rods become unremovable from the base. Disassembly then involves removal of the rod by manual tools which can shear the rod off, leaving the threaded end portion firmly embedded in the metal end cap. Therefore, the end cap must then be replaced.

With all screen-type strainers, the element must be periodically cleaned out in order to maintain an acceptable pressure loss through any subsequent valving. Prior art designs do not allow the screen to be observed from above which, as may be expected, is the most common viewing angle since the strainers are typically mounted near the deck as described above.

Finally, typical prior art strainers include an inlet and outlet oriented 180° from each other which eliminates the ability to selectively mount the strainer in corners or other areas where spacing is limited.

Accordingly, there exists a need for an improved sea water strainer.

SUMMARY OF THE INVENTION

It is accordingly an object of the present invention to provide a sea water strainer which may be easily installed with common hand tools.

It is another object of the present invention to provide a sea water strainer which is easy to disassemble.

Another object of the present invention is to provide a sea water strainer wherein the screen element may be readily observed from above the unit.

Still another object of the present invention is to provide a sea water strainer which may be mounted in corners and in other obstructed or partially obstructed areas.

To that end, a sea water strainer for use with marine craft includes a reservoir forming member, two end portions having the reservoir forming member disposed therebetween to define a reservoir intermediate the end portions with at least one of the end portions being formed with at least one inlet channel and at least one outlet channel with both the inlet channel and the outlet channel being in fluid communication with the reservoir, an arrangement for straining fluid mounted intermediate the inlet channel and the outlet channel and an assembly for mounting the strainer to a support surface. The mounting assembly includes at least one mounting support body formed in at least one of the end portions and having a bore formed therein for passage of a mounting bolt therethrough with a mounting support body having an inlet opening and an outlet opening formed therein with the bore extending therebetween to define a bore inlet and a bore outlet with the inlet opening being vertically offset a predetermined distance from the bore outlet opening to form an inclined bore. Preferably, the mounting support body is mounted at a lateral edge of one of the end portions.

It is preferred that both the inlet channel and the outlet channel are formed in one of the end portions. Preferably, the arrangement for straining includes a perforated basket sized to fit within the reservoir forming member. It is further preferred that at least one of the end portions be formed with a sighting bore extending therethrough adjacent the straining arrangement and the present invention further preferably includes a transparent blocking member configured for being removably retained within the sighting bore in a sealed, watertight relationship with the end portion.

It is further preferred that the present invention include at least one rod member extending between the end portions with the reservoir forming member disposed between the end portions and an arrangement associated with at least one rod member for retaining the end portions against the reservoir forming member to retain the end portions and the reservoir forming member in a sealed, watertight relationship. Preferably, at least one of the end portions is formed with an opening for passage of a portion of at least one rod member therethrough with the at least one rod member being formed with at least one threaded end segment with the assembly associated with the at least one rod member for retaining end portions against the reservoir forming member including a nut threadedly attached to the rod end segment. It is preferred that the present invention further include at least one projection mounted to at least one end portion adjacent the rod passage opening in a position to prevent a nut being threaded onto a rod member for rotating with that rod member inserted through the rod passage opening during assembly and disassembly of the sea water strainer. It is further preferred that the reservoir forming member be formed as a transparent cylinder.

The use of the inclined bore in the mounting bodies, which may be formed at a 30° inclination, allows common tools such as air tools and screwdrivers to be used for quick installation because the body of the strainer is not blocking screw access.

According to another aspect of the present invention, the sea water strainer for use with marine craft includes a reservoir forming member, two end portions having the reservoir forming member disposed therebetween to define a reservoir intermediate the end portions with at least one of the end portions having at least four side edges and being formed with at least one inlet channel and at least one outlet channel therein with both the inlet channel and the outlet channel being in fluid communication with the reservoir. The inlet channel includes two access openings with each inlet access opening being formed along one side edge of the end portion. The outlet channel includes two access openings with each outlet access opening being formed along one side edge of the end portion and an assembly for blocking at least one of the inlet openings and at least one of the outlet openings selectively removably receivable in at least one of the inlet openings and at least one of the outlet openings for directing fluid flow into and out of the strainer. Further, the invention includes an arrangement for straining fluid intermediate the inlet channel and the outlet channel and an arrangement for mounting the strainer to a support surface.

Preferably, the mounting assembly is as described above. Further, all other aspects of the present invention are as described above.

The present invention, as described above, provides several key improvements over the prior art. Since the tie rods do not thread directly into the strainer base but, as described above, pass through openings and are retained by nuts, the likelihood of breaking one during disassembly is substantially reduced. Additionally, projections formed as tabs are provided to retain the nut in place while the rod is screwed thereinto, which further eases assembly and disassembly. According to another feature, the end cap for viewing the strainer is a UV stabilized, transparent, impact-resistant plastic cap to allow easy observation of the basket from above. Further, slots are formed in the cap to allow the cap to be tightened without the use of special tools. Any bar-like piece may be used to tighten the cap, if the cap is to be tightened beyond that achievable by hand.

The unique design providing two inlets and two outlets coupled with two flow path plugs allows the user to select a flow path according to installation requirements. With the plugs, outlet flow can be designated to be perpendicular to inlet flow, thus allowing the strainer to be mounted in any position, even in corners. Further, having two outlets allows the outlet manifold to have a cross-sectional area much larger than has been realized with the prior art, thereby reducing the pressure drop through any subsequent valve. As will be seen, the outlet channel covers a 180° arc.

Versatility of the present invention is additionally enhanced by having two inlets and two outlets. The strainer could possibly be oversized and used with one inlet and two outlets. Each outlet could then supply water for different uses, such as engine cooling or air conditioning. Further, another cost savings is realized by using fewer through-hull fittings, related fittings and associated piping. Further, only one hole need be formed in the hull, thus reducing the likelihood of failure.

Additionally, a valve may be attached to the unused inlet, piping from the bilge may be added to that valve and the strainer used as an emergency bilge pump. This will be defined in greater detail hereinafter.

By the above, the present invention provides a unique and versatile sea water strainer having two end caps separated by a reservoir forming member with one inlet, one outlet and a strainer therebetween.

DETAILED DESCRIPTION OF THE PREFERRED EMBODIMENT

Figure 1:
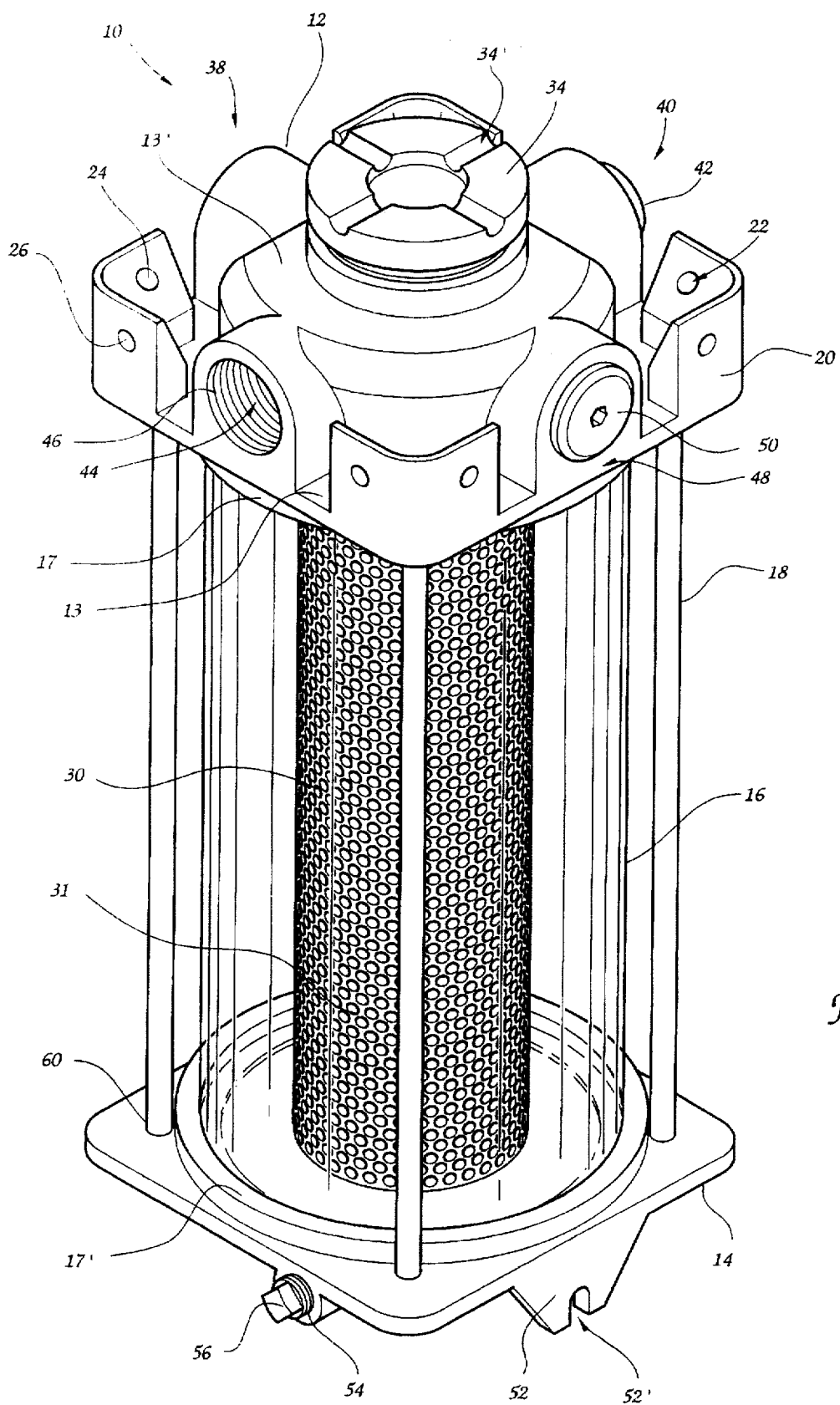
FIG. 1 is a perspective view of a sea water strainer according to the preferred embodiment of the present invention.

Turning now to the drawings and, more particularly, to FIG. 1, a sea water strainer according to the preferred embodiment of the present invention is illustrated generally at 10 and includes a top end cap 12, a bottom end cap 14 and a transparent reservoir forming member 16 disposed therebetween. The end caps 12,14 are generally square members having several functional, raised surfaces formed therein as will be explained in greater detail hereinafter. The reservoir forming member 16 is a generally transparent cylinder which may be formed of glass, plexiglass or other transparent material. Alternately, the reservoir forming member 16 may be formed from an opaque material but in such a case it would be desirable to leave at least a transparent portion available so that the contents and water level within the strainer may be viewed.

Figure 2:
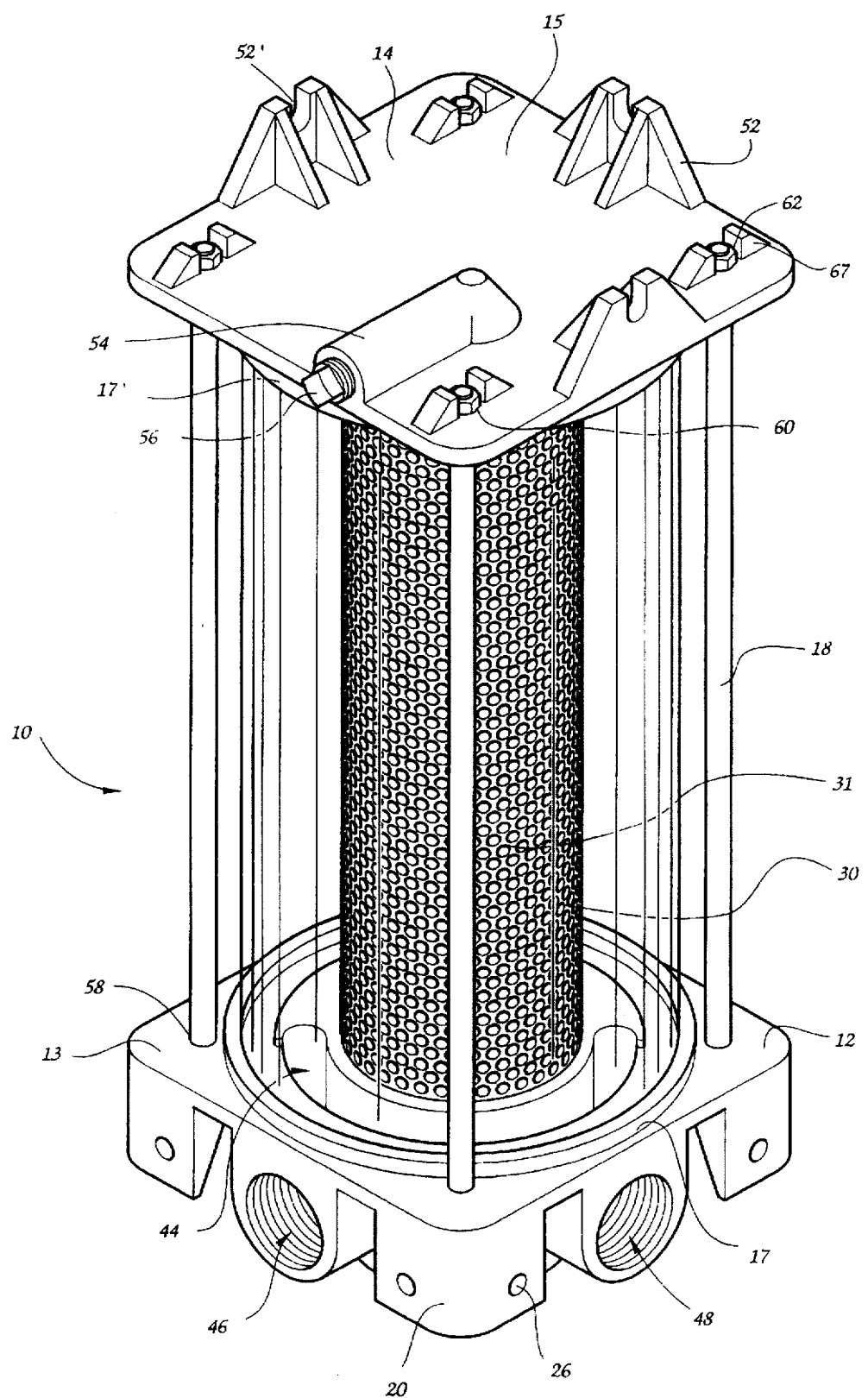
FIG. 2 is a perspective view of the sea water strainer illustrated in FIG. 1 in an inverted position.
Figure 3:
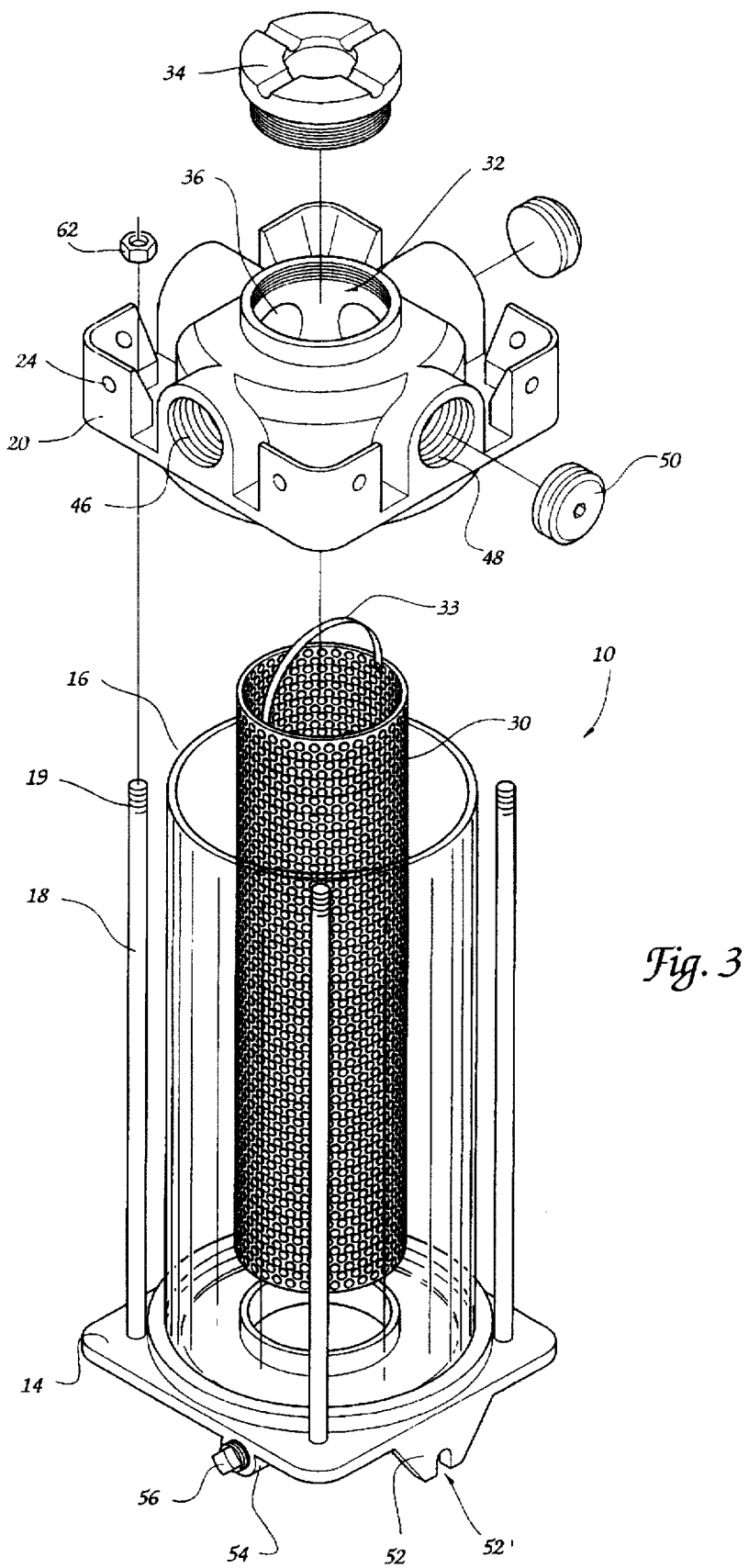
FIG. 3 is a partially exploded view of the sea water strainer illustrated in FIG. 1.
Figure 5:
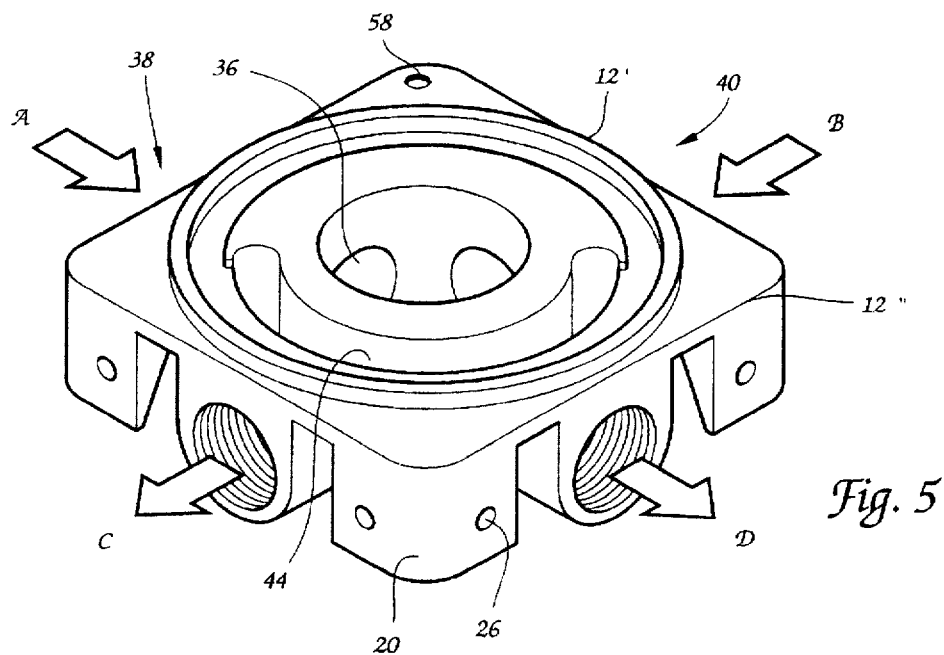
FIG. 5 is a perspective view of the top end cap illustrated in FIG. 4 in an inverted position.

The end caps 12,14 include surfaces configured for mating with the reservoir forming member 16 which preferably include rings 17,17' formed in relief along a generally flat surface of each end cap 12,14 which is sized for fitment of the end portions of the cylindrical reservoir forming member 16 therein. As is known in the art, in order to provide watertight integrity for the multi-part sea water strainer of the present invention, gaskets (not shown) are disposed intermediate the reservoir forming member 16 and each cap 12,14. In order to hold the end caps 12,14 and reservoir forming member 16 in watertight, sealed relation, a plurality of rods 18 are provided to extend intermediate the end caps 12,14 adjacent the reservoir forming member 16. Since the end caps 12,14 are formed as generally square, four-edged members, one rod 18 is fitted near each corner of the end caps 12,14 to extend therebetween. The rods 18 are generally cylindrical elongate members with threaded end segments 19 formed therein as seen in FIG. 3. As seen in FIGS. 2 and 5, openings 58 are formed in the upper end cap 12 for fitment of at least a portion of the threaded segment 19 of each rod 18 therethrough. Corresponding openings 60 are formed in the lower end cap 14 as seen in FIGS. 1 and 2. The end caps 12,14 are drawn together to seal against the reservoir forming member 16 by the placement of nuts 60 on the threaded end segments 19 of each rod 18. As may be expected, once the threaded end segment 19 is directed inwardly into a nut 60, it may be continually tightened until the necessary sealing relation between the end caps 12,14 and reservoir forming member 16 is attained.

In order to provide the necessary filtration or straining function, a perforated, cylindrical basket 30 is disposed within the reservoir formed by the reservoir forming member 16 and is formed with a diameter sufficient to allow its insertion in the reservoir while allowing sufficient space for water to flow within the reservoir. As seen in FIG. 3, a small handle 31 is pivotally mounted to the outward end of the strainer basket 30 for ease of insertion and removal when assembling and disassembling the strainer 10.

The upper or top end cap 12 is formed with an inlet channel 36 and an outlet channel 44 therein. The channels 36,44 are formed such that fluid flow may be attained generally from the inlet channel 36 through the basket 30 and outward through the outlet channel 44. As will be seen presently, the present invention is unique in its versatility with respect to selective fluid flow through the strainer 10.

Figure 4:
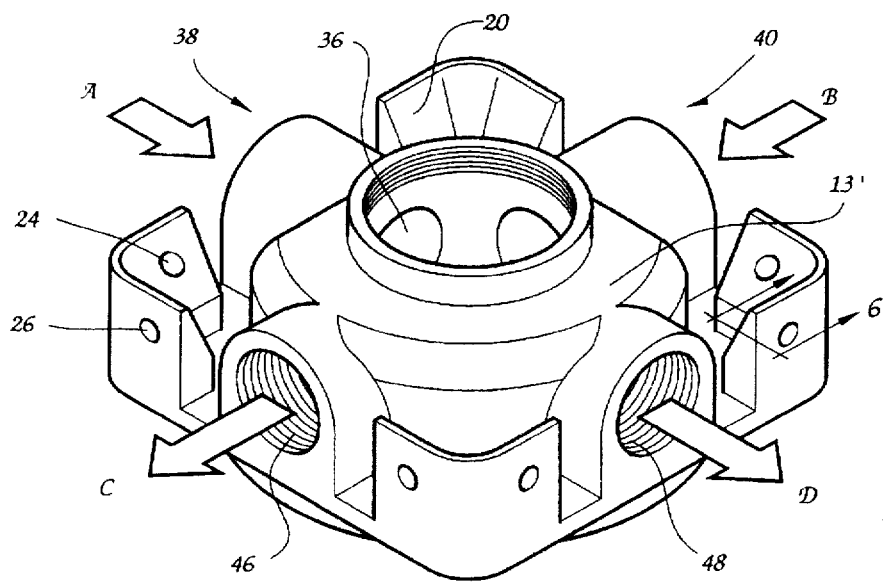
FIG. 4 is a perspective view of the top end cap of the sea water strainer illustrated in FIG. 1.

Turning now to FIGS. 4 and 5, the upper end cap 12 is seen to include a generally planar base 13 with a central dome 13' formed thereon. The base includes inlet side edges 12' and outlet side edges 12" to form a four-sided structure. A first inlet access opening 38 is formed along one inlet side edge 12 in fluid communication with the inlet channel 36 and extends inwardly toward the central dome 13'. A second inlet access opening 40 is formed 90° away from the first inlet access opening 38 and is also in fluid communication with the inlet channel 36. As seen in FIG. 3, a threaded plug 50 is adapted for removable receipt in threaded openings associated with the first and second inlet access openings 38,40.

An outlet access opening 46 is formed in the top end cap 12 in fluid communication with the outlet channel 44. This first outlet access opening 46 is formed 90° away from the first inlet access opening 38 and 180° away from the second inlet access opening 40 along an outlet side edge 12". A second outlet access opening 48 is formed along the remaining outlet side edge 12" in a position 90° away from the second inlet access opening 40 and 180° away from the first inlet access opening 38. Therefore, the top end cap 12 is formed as a generally planar base 13 having the aforesaid central dome 13' projecting upwardly therefrom with four access openings 38,40,46,48 projecting in four directions away from the central dome 13' to provide a symmetric structure. A sighting bore 32 is formed in the center of the central dome 13' and is in communication with the inlet channel 36. The function of the sighting bore 32 will be explained in greater detail hereinafter.

As seen in FIGS. 4 and 5, the arrangement of the inlet access openings 38,40 allows inward fluid flow in directions indicated by arrows A and B. Similarly, the outlet flow through outlet access openings 46,48 is in the directions indicated by arrows C and D. As will be seen, the symmetry of the top cap 12 adds to the versatility of the present invention with regard to placement in relation to input and output fluid flow lines.

Figure 6:
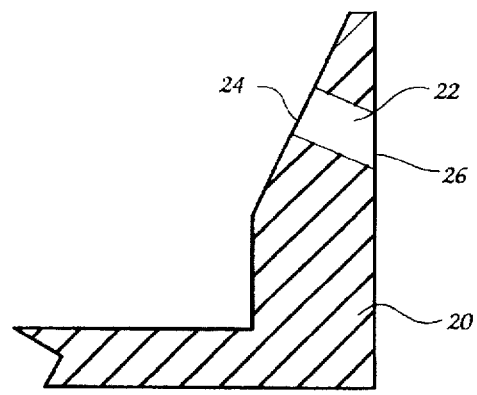
FIG. 6 is a cross-sectional view of a mounting support body taken along line 6—6 in FIG. 4.

In order to provide the mounting versatility associated with the present invention, mounting support bodies 20 are formed at each corner of the top cap 12. Alternately, they may be formed in the center of the edges 12,12', above the access openings 38,40,46,48. The support bodies 20 are generally wedge-shaped members, seen in cross-section in FIG. 6, which span the 90° angle formed at the corners of the top cap 12 in a curved manner with mounting bores 24 extending therethrough in an orientation 90° away from one another. Therefore, each corner mounting support body 20 may support a through-bolt (not shown) in two directions. In order to allow the use of ordinary tools for installation, the operational interface of any through-bolt used must be readily accessible in spite of the central dome 13' and the housings for the access openings 38,40,46,48. To accomplish this, the bores 22 are formed at an incline as seen in FIG. 6. Therefore, the inlet to the bore 24 is disposed in an offset manner from the bore outlet 26 such that the bore 22 is inclined in a downward manner when the strainer 10 is in an upright position. This inclined bore 26 places the operational interface of the through-bolt, be it a hexagonal bolt head or a screw slot at an upwardly directed orientation with respect to the strainer 10 such that full access to the through bolt (not shown) is realized.

The bottom cap 14 is formed with a generally planar base 15 with the aforesaid locator ring 17' for the reservoir forming member 16 projecting outwardly from one end thereof. On the opposite, lower side of the lower cap 14, abbreviated triangular projections 52 project outwardly from three side edges thereof to form support flanges for lower mounting screws (not shown). A U-shaped opening 52' is formed in the end of the abbreviated triangle to accommodate a lower mounting screw (not shown). A drain 54 is formed in the base 14 as an elongate channel and, as seen in FIGS. 1 and 2, the drain location may be on either side of the lower cap 14 with a threaded plug 56 closing the drain. It should be noted that the drain 54 empties along one side edge of the lower cap 14 to provide easy access. Additionally, projections 67 are formed integrally with the lower cap 14 adjacent the openings 62 through which the threaded end segments 19 of the rods 18 pass. These projections 67 are spaced sufficiently to allow a nut 62 to be slipped therebetween but will not allow the nut 62 to rotate. This acts as a holding grip for the nuts 62 to eliminate the need for pliers or additional assembly tools.

Often it becomes desirable to peer into the strainer 30 to determine the level of acquired debris. As may be expected, the openings 31 formed in the perforated basket 30 are not conducive to viewing the contents of the strainer 30 from the side through the transparent cylindrical reservoir forming member 16. Therefore, the sighting bore 32 is formed in the central dome 13' with a transparent threaded cap 34 configured for removable receipt within the sighting bore 32. This cap 34 includes several U-shaped channels 34' formed therein for tightening using any handy bar-like member. This eliminates the need for special tools to remove or tighten the cap. The transparent cap 34 allows sighting into the strainer 30 from above.

In operation, the features of the present invention are welcomed. Initially, due to the symmetrical nature of the upper end cap 12, the strainer may be assembled according to its ultimate orientation. The rods 18 are threaded into nuts 62 intermediate the projections 67 on the lower cap 14. All four rods 18 are located, then the reservoir forming member 16 is placed onto the lower cap 14 within the ring 17'. The strainer 30 is then placed within the reservoir forming member 16. This stage of assembly is best seen in FIG. 3. At this time, it should be determined the orientation of the inlet and outlet lines and where the strainer 10 should be mounted. Once this is determined, the plugs 50 are threadedly inserted in the desired inlet access opening 38,40 and the desired outlet access opening 44,48. This alignment ultimately directs fluid flow through the strainer. Care should be taken in inserting the plugs 50 such that at least one inlet opening 38,40 is left available for hose connection and one outlet openings 44,48 is available for hose connection. It is not necessary to block both inlet openings and both outlet openings. Each can be left open with two hoses going in and two hoses going out or any selective combination of hoses may be attached to the strainer with the only requirement being that at least one inlet opening 38,40 be used and one outlet opening 44,48 be used so as to achieve flow through the strainer 10.

Once this orientation has been decided, the upper end cap 12 may be placed onto the reservoir forming member 16 and attached using conventional nuts 62 on the threaded end segments of the rods 18. These nuts 62 are tightened down such that watertight integrity is maintained with the strainer 10. Finally, the transparent cap 34 for the sighting bore 32 is threadedly attached to the central dome 13' The strainer is then assembled and it may be mounted to any support surface using conventional bolts extending through the bore 22 and the mounting support body 20. Preferably, a lower screw (not shown) will be inserted partially into the support structure and then the U-shaped channel of the lower mounting flange 52 fitted thereover. Once the strainer 10 is leveled in a vertical orientation, bolts (not shown) may be extended through the through bores 22 to mount the strainer 10 to a support structure.

By the above, the present invention provides a marine strainer of exceptional versatility and user friendliness. The cost of the strainer is no greater than strainers in the prior art, yet the benefits attained through the present invention are significant.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A sea water strainer for use with marine craft comprising:
   a reservoir forming member;
   two end portions having said reservoir forming member disposed therebetween to define a reservoir intermediate said end portions, at least one of said end portions being formed with at least one inlet channel and at least one outlet channel, with both said inlet channel and said outlet channel being in fluid communication with said reservoir;
   means for straining a fluid mounted intermediate said inlet channel and said outlet channel; and
   means for mounting said strainer to a support surface, said mounting means including at least one mounting support body formed in at least one of said end portions and having a bore formed therein for passage of a mounting bolt therethrough, said mounting support body having an inlet opening and an outlet opening formed therein with said bore extending therebetween to define a bore inlet and a bore outlet with said bore inlet opening being vertically offset a predetermined distance from said bore outlet opening to form an inclined bore.

2. A sea water strainer according to claim 1 wherein said mounting support body is mounted at a lateral edge of one of said end portions.

3. A sea water strainer according to claim 1 wherein both said inlet channel and said outlet channel are formed in one of said end portions.

4. A sea water strainer according to claim 1 wherein said means for straining includes a perforated basket sized to fit within said reservoir forming member.

5. A sea water strainer according to claim 1 wherein at least one of said end portions is formed with a sighting bore extending therethrough adjacent said means for straining and further comprising a transparent blocking member configured for being removably retained within said sighting bore in a sealed, watertight relationship with said end portion.

6. A sea water strainer according to claim 1 and further comprising at least one rod member extending between said end portions with said reservoir forming member disposed between said end portions adjacent said at least one rod member, and means associated with said at least one rod member for retaining said end portions in abutment with said reservoir forming member to retain said end portions and said reservoir forming member in a sealed, watertight relationship.

7. A sea water strainer according to claim 6 wherein at least one of said end portions is formed with an opening for passage of at least a portion of said at least one rod member therethrough, said at least one rod member is formed with at least one threaded end segment, and said means associated with said at least one rod member for retaining said end portions against said reservoir forming member includes a bolt threadedly attached to said rod end segment.

8. A sea water strainer according to claim 7 and further comprising at least one projection mounted to said at least one end portion adjacent said rod passage opening in a position to prevent a nut being threaded onto a rod member from rotating with that rod member inserted through said rod passage opening during assembly and disassembly of said sea water strainer.

9. A sea water strainer according to claim 1 wherein said reservoir forming member is transparent.

10. A sea water strainer according to claim 1 wherein said reservoir forming member is a transparent cylinder.

11. A sea water strainer for use with marine craft comprising:
    a reservoir forming member;
    two end portions having said reservoir forming member disposed therebetween defining a reservoir intermediate said end portions, at least one of said end portions having at least four side edges and being formed with at least one inlet channel and at least one outlet channel therein, with both said inlet channel and said outlet channel being in fluid communication with said reservoir, said inlet channel having two access openings, each said inlet access opening being formed along one side edge of said end portion, said outlet channel having two access openings, each said outlet access opening being formed along one side edge of said end portion;
    means for blocking at least one said inlet opening and at least one said outlet opening selectively removably receivable in at least one said inlet opening and at least one said outlet opening for directing fluid flow into and out of said sea water strainer;
    means for straining a fluid mounted intermediate said inlet channel and said outlet channel; and means for mounting said strainer to a support surface.

12. A sea water strainer according to claim 11 wherein said means for mounting said strainer to a support surface includes at least one mounting support body formed in at least one of said end portions and having a bore formed therein for passage of a mounting bolt therethrough, said mounting support body having an inlet opening and an outlet opening formed therein with said bore extending therebetween to define a bore inlet and a bore outlet with said inlet opening being vertically offset a predetermined distance from said outlet opening to form an inclined bore.

13. A sea water strainer according to claim 11 wherein said mounting support body is mounted at a lateral edge of one of said end portions.

14. A sea water strainer according to claim 11 and further comprising at least one rod member extending between said end portions with said reservoir forming member disposed between said end portions adjacent said at least one rod member, and means associated with said at least one rod member for retaining said end portions against said reservoir forming member to retain said end portions and said reservoir forming member in a sealed watertight relationship.

15. A sea water strainer according to claim 14 wherein at least one of said end portions is formed with an opening for passage of a portion of said at least one rod member therethrough, said at least one rod member is formed with at least one threaded end segment, and said means associated with said at least one rod member for retaining said end portions against said reservoir forming member includes a bolt threadedly attached to said rod end segment.

16. A sea water strainer according to claim 15 and further comprising at least one projection mounted to said at least one end portion adjacent said rod passage opening in a position to prevent a nut being threaded onto a rod member from rotating with that rod member inserted through said rod passage opening during assembly and disassembly of said sea water strainer.

17. A sea water strainer according to claim 11 wherein said means for straining includes a perforated basket sized to fit within said reservoir forming member.

18. A sea water strainer according to claim 11 wherein at least one of said end portions is formed with a sighting bore extending therethrough adjacent said means for straining and further comprising a transparent blocking member configured for being removably retained within said sighting bore in a sealed, watertight relationship with said end portion.

19. A sea water strainer according to claim 11 wherein said reservoir forming member is transparent.

20. A sea water strainer according to claim 11 wherein said reservoir forming member is a transparent cylinder.

21. A sea water strainer for use with marine craft comprising:

a transparent cylindrical member forming a reservoir;

two end portions having said reservoir forming member disposed therebetween to define a reservoir intermediate said end portions, at least one of said end portions having at least four side edges and being formed with at least one inlet channel and at least one outlet channel therein, with both said inlet channel and said outlet channel being in fluid communication with said reservoir, said inlet channel having two access openings, each said inlet access opening being formed along one side edge of said end portion, said outlet channel having two access openings, each said outlet access opening being formed along one side edge of said end portion;

means for blocking at least one said inlet opening and at least one said outlet opening selectively removably receivable in at least one said inlet opening and at least one said outlet opening for directing fluid flow into and out of said sea water strainer;

means for straining a fluid including a perforated basket sized to fit within said reservoir forming member mounted intermediate said inlet channel and said outlet channel; and means for mounting said strainer to a support surface, said mounting means including at least one mounting support body formed in at least one of said end portions and having a bore formed therein for passage of a mounting bolt therethrough, said mounting support body having an inlet opening and an outlet opening formed therein to define a bore inlet and a bore outlet with said bore inlet opening being vertically offset a predetermined distance from said bore outlet opening to form an inclined bore.

22. A sea water strainer according to claim 21 wherein said means for mounting said strainer to a support surface includes a mounting support body formed in at least one of said end portions and having a bore formed therein for passage of a mounting bolt therethrough, said mounting support body having an inlet opening and an outlet opening formed therein with said bore extending therebetween to define a bore inlet and a bore outlet with said inlet opening being vertically offset a predetermined distance from said outlet opening to form an inclined bore.

23. A sea water strainer according to claim 22 wherein said mounting support body is mounted at a lateral edge of one of said end portions.

24. A sea water strainer according to claim 23 and further comprising at least one rod member extending between said end portions with said reservoir forming member disposed between said end portions, and means associated with said at least one rod member for retaining said end portions against said reservoir forming member to retain said end portions and said reservoir forming member in a sealed, watertight relationship.

25. A sea water strainer according to claim 24 wherein said end portion is formed with an opening for passage of a portion of said at least one rod member therethrough, said at least one rod member is formed with at least one threaded end segment, and said means associated with said at least one rod member for retaining said end portions against said reservoir forming member includes a bolt threadedly attached to said rod end segment.

26. A sea water strainer according to claim 25 and further comprising at least one projection mounted to said at least one end portion adjacent said rod passage opening in a position to prevent a nut being threaded onto a rod member from rotating with that rod member inserted through said rod passage opening during assembly and disassembly of said sea water strainer.

27. A sea water strainer according to claim 21 wherein at least one of said end portions is formed with a sighting bore extending therethrough adjacent said means for straining and further comprising a transparent blocking member configured for being removably retained within said sighting bore in a sealed, watertight relationship with said end portion.

* * * * *